US006250616B1

(12) United States Patent
Suzuki et al.

(10) Patent No.: US 6,250,616 B1
(45) Date of Patent: Jun. 26, 2001

(54) FLUID-FILLED VIBRATION DAMPING DEVICE

(75) Inventors: Tatsuya Suzuki, Kasugai; Kazuhiko Kato, Komaki, both of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/448,615

(22) Filed: Nov. 23, 1999

(30) Foreign Application Priority Data

Dec. 24, 1998 (JP) .................................... 10-366627

(51) Int. Cl.[7] ....................................................... F16F 5/00
(52) U.S. Cl. ........................................ 267/140.13; 267/219
(58) Field of Search .......................... 267/140.11, 140.13, 267/140.3, 140.4, 140.5, 141.2, 141.3, 141.4, 141.5, 219; 248/562, 636; 180/300

(56) References Cited

U.S. PATENT DOCUMENTS

| | | | |
|---|---|---|---|
| 5,333,847 | * 8/1994 | Kanda | 267/140.12 |
| 5,375,822 | * 12/1994 | Hirasawa et al. | 267/140.15 |
| 5,632,472 | 5/1997 | Kato et al. . | |
| 5,642,873 | * 7/1997 | Kato | 267/140.14 |
| 6,010,120 | * 1/2000 | Nagasawa | 267/140.14 |
| 6,082,717 | * 7/2000 | Nanno | 267/140.14 |

FOREIGN PATENT DOCUMENTS

| | | |
|---|---|---|
| 5-12788 | 2/1993 | (JP) . |
| 8-14311 | 1/1996 | (JP) . |

* cited by examiner

Primary Examiner—Robert J. Oberleitner
Assistant Examiner—Melanie Talavera
(74) Attorney, Agent, or Firm—Burr & Brown

(57) ABSTRACT

A fluid-filled vibration damping device including a first and a second member, a rubber body which connects the first and second members to each other and which provides a wall of a fluid chamber, and a working member which is supported by the first member so as to extend in a first direction perpendicular to a second direction in which a vibrational load is applied to the damping device, thereby dividing the fluid chamber into two divided chambers which are located on opposite sides of the working member, respectively, and which are communicated with each other via a fluid-flow restricting passage defined by at least the working member, a length of the restricting passage in the second direction and/or a width of the passage in the first direction changing in a circumferential direction of the working member.

12 Claims, 6 Drawing Sheets

FLUID-FILLED VIBRATION DAMPING DEVICE

BACKGROUND OF THE INVENTION

1. Field of the Invention

The present invention relates to a fluid-filled vibration damping device which exhibits a vibration damping effect based on flows of a non-compressible fluid enclosed therein, and which are particularly suitable for use as, e.g., automotive-vehicle engine mounts, body mounts, and differential mounts.

2. Related Art Statement

There is known a fluid-filled vibration damping device as a sort of vibration-damping connecting or supporting device that is interposed between two members of a vibration transmitting system, for connecting the two members in a vibration damping fashion. The fluid-filled vibration damping device includes a first mounting member adapted to be attached to one of the two members; a second mounting member adapted to be attached to the other of the two members; and an elastic rubber body which elastically connects the first and second mounting members to each other and which provides a portion of a fluid-chamber wall defining a fluid chamber filled with a non-compressible fluid. When a vibrational load is applied to the vibration damping device, it exhibits a vibration damping effect based on flows of the fluid in the fluid chamber, in particular, resonance of the fluid.

Meanwhile, there has been proposed another fluid-filled vibration damping device which includes, in addition to the above-indicated members, a working or umbrella-shaped member which is supported by the first mounting member such that the umbrella member extends, in the fluid chamber, in a direction substantially perpendicular to a direction in which a main vibrational load is applied to the vibration damping device, and thereby divides the fluid chamber into two divided chambers which are located on opposite sides of the umbrella member, respectively, and which are communicated with each other via a fluid-flow restricting passage defined by at least the umbrella member.

Upon application of the main vibrational load to the second vibration damping device including the umbrella member, the umbrella member is reciprocatively moved in the fluid chamber, so that the fluid flows through the fluid-flow restricting passage. The second vibration damping device can exhibit a vibration damping effect based on the flows of the fluid through the restricting passage, in particular, the resonance of the fluid.

However, even in the second vibration damping device, the vibration damping effect based on the flows of the fluid through the restricting passage defined by the umbrella member is effective against only vibrations having frequencies in a pre-tuned frequency range. In particular, when a vibration having a frequency higher than the pre-tuned range is input to the vibration damping device, the resistance to the flows of the fluid through the restricting passage is excessively increased so that the vibration damping device exhibits an inappropriate (i.e., high) dynamic spring characteristic, which leads to largely lowering the vibration damping performance of the device. Thus, the prior vibration damping device cannot exhibit an appropriate or low dynamic spring characteristic in a wide frequency range.

SUMMARY OF THE INVENTION

It is therefore an object of the present invention to provide a fluid-filled vibration damping device which has an improved structure for exhibiting, based on a working member provided in a fluid chamber, a low dynamic spring characteristic in a wide frequency range and thereby exhibiting an excellent vibration damping effect against vibrations in the wide frequency range.

The present invention provides a fluid-filled vibration damping device which has one or more of the technical features that are described below in respective paragraphs given parenthesized sequential numbers (1) to (13). Any technical feature which includes another technical feature shall do so by referring, at the beginning, to the parenthesized sequential number given to that technical feature. Thus, two or more of the following technical features may be combined, if appropriate. Each technical feature may be accompanied by a supplemental explanation, as needed. However, the following technical features and the combinations thereof are just examples to which the present invention is by no means limited. Rather, the concept of the present invention should be construed based on the overall description of the specification and the drawings.

(1) According to a first feature of the present invention, there is provided a fluid-filled vibration damping device for connecting two members to each other in a vibration damping fashion, comprising a first mounting member which is adapted to be attached to one of the two members; a second mounting member which is adapted to be attached to the other of the two members; an elastic rubber body which elastically connects the first and second mounting members to each other and which provides a portion of a fluid-chamber wall defining a fluid chamber filled with a non-compressible fluid; and a working member which is supported by the first mounting member such that the working member extends, in the fluid chamber, in a first direction substantially perpendicular to a second direction in which a main vibrational load is applied to the fluid-filled vibration damping device, and thereby divides the fluid chamber into two divided chambers which are located, in the second direction, on opposite sides of the working member, respectively, and which are communicated with each other via a fluid-flow restricting passage defined by at least the working member, at least one of a length of the fluid-flow restricting passage in the second direction and a width of the restricting passage in the first direction changing in a circumferential direction of the working member, the restricting passage consisting of (a) a pair of first fluid-flow portions which are opposed to each other in the first direction, each of the two first fluid-flow portions extending over an angle of from 30 degrees to 80 degrees in the circumferential direction of the working member, and having a first ratio, $A_s/L_s$, of a cross-section area, $A_s$, thereof to the length, $L_s$, thereof; and (b) a pair of second fluid-flow portions which are opposed to each other in a direction perpendicular to each of the first and second directions, each of the two second fluid-flow portions extending over an angle of from 150 degrees to 100 degrees in the circumferential direction of the working member, and having a second ratio, $A_w/L_w$, of a cross-section area, $A_w$, thereof to the length, $L_w$, thereof, the second ratio $A_w/L_w$ being greater than the first ratio $A_s/L_s$, and a ratio, $(A_s/L_s)/(A_w/L_w)$, of the first ratio $A_s/L_s$ to the second ratio $A_w/L_w$ being not smaller than ⅒ and being not greater than ½.

The fluid-flow restricting passage may consist of an annular space or gap defined by, and between, respective opposed portions of an outer circumferential surface of the working member and an inner circumferential surface of the fluid-chamber wall, or may consist of the annular gap and through-holes formed through the thickness of the working member. In the case where the restricting passage consists of the annular gap and the through-holes, the width of the restricting passage in the first direction is defined as the sum of the respective widths of the annular gap and each through-hole in the first direction.

The Applicants have found, from their various experiments and studies, that the fluid-filled vibration damping device according to the first feature (1) wherein the fluid-flow restricting passage consists of the two first fluid-flow portions and the two second fluid-flow portions and each of the two first fluid-flow portions extends, in the circumferential direction of the working member, over the predetermined angle relative to each of the two second fluid-flow portions, and has the predetermined ratio of cross-section area to length relative to that of each of the two second fluid-flow portions, can exhibit, based on the resonance of the fluid flowing through the restricting passage, a low (i.e., excellent) dynamic spring characteristic in a wide frequency range. Thus, the Applicants' invention has been achieved.

The reason why the fluid-flow restricting passage constructed as described above enjoys the above-indicated advantage has not been technically elucidated. However, the reason why each of the two first fluid-flow portions extends over the predetermined angle of from 30 degrees to 80 degrees that is smaller than the predetermined angle of from 150 degrees to 100 degrees over which each of the two second fluid-flow portions extends, is as follows: If each first fluid-flow portion extends over more than 80 degrees, the influence to the vibration damping characteristic of the flows of the fluid through the first fluid-flow portions is excessively increased, i.e., becomes too dominant, whereas the low dynamic spring effect exhibited in a high frequency range by the flows of the fluid through the second fluid-flow portions is lowered. Meanwhile, if each first fluid-flow portion extends over less than 30 degrees, the low dynamic spring effect exhibited by the flows of the fluid through the first fluid-flow portions is excessively lowered. The reason why the ratio $(A_s/L_s)/(A_w/L_w)$ of the first ratio $A_s/L_s$ to the second ratio $A_w/L_w$ is not smaller than $1/10$ and is not greater than $1/2$ is as follows: If the ratio $(A_s/L_s)/(A_w/L_w)$ is smaller than $1/10$, the vibration damping device has the tendency of exhibiting a high (i.e., inappropriate) dynamic spring characteristic in a frequency range between respective frequency ranges in which it exhibits a low dynamic spring effect based on the flows of the fluid through the first fluid-flow portions and the flows of the fluid through the second fluid-flow portions. Meanwhile, if the ratio $(A_s/L_s)/(A_w/L_w)$ is greater than $1/2$, it behaves as if the flows of the fluid through the first fluid-flow portions and the flows of the fluid through the second fluid-flow portions were fused with each other and accordingly exhibits a low dynamic spring effect in a narrow frequency range only.

The fluid-filled vibration damping device according to the first feature (1) has the combination of the first feature that each of the two first fluid-flow portions extends over the predetermined angle relative to each of the two second fluid-flow portions, and the second feature that each of the two first fluid-flow portions has the predetermined ratio of cross-section area to length relative to that of each of the two second fluid-flow portions. Therefore, the vibration damping device can exhibit, based on the resonance of the fluid flowing through the first fluid-flow portions and the resonance of the fluid flowing through the second fluid-flow portions, a low dynamic spring effect in a wide frequency range. Thus, the present vibration damping device can exhibit an effective vibration damping effect against input vibrations in the wide frequency range.

(2) According to a second feature of the present invention that includes the first feature (1), the each of the two first fluid-flow portions extends over an angle of from 40 degrees to 60 degrees in the circumferential direction of the working member, and the each of the two second fluid-flow portions extends over an angle of from 140 degrees to 120 degrees in the circumferential direction of the working member.

(3) According to a third feature of the present invention that includes the first or second feature (1) or (2), the ratio $(A_s/L_s)/(A_w/L_w)$ is not smaller than $1/6$ and is not greater than $1/3$.

(4) According to a fourth feature of the present invention that includes any one of the first to third features (1) to (3), at least one of the cross-section area $A_s$ and the length $L_s$ of the each first fluid-flow portion is different from a corresponding one of the cross-section area $A_w$ and the length $L_w$ of the each second fluid-flow portion. For example, each of the two parameters $A_s$, $L_s$ of each first fluid-flow portion may be different from a corresponding one of the two parameters $A_w$, $L_w$ of each second fluid-flow portion. However, only one of the two parameters $A_s$, $L_s$ of each first fluid-flow portion may be different from a corresponding one of the two parameters $A_w$, $L_w$ of each second fluid-flow portion, and the other of the two parameters $A_s$, $L_s$ of each first fluid-flow portion may be equal to a corresponding one of the two parameters $A_w$, $L_w$ of each second fluid-flow portion.

(5) According to a fifth feature of the present invention that includes any one of the first to fourth features (1) to (4), the second mounting member includes a tubular portion having an end open toward the first mounting member, the elastic rubber body elastically connecting between the first mounting member and the open end of the tubular portion of the second mounting member, the tubular portion of the second mounting member providing a tubular portion of the fluid-chamber wall.

In the fluid-filled vibration damping device according to the fifth feature (5), the highly rigid tubular portion of the fluid-chamber wall cooperates with the working member to define the fluid-flow restricting passage. Accordingly, upon reception of a vibrational load, the vibration damping device can maintain the predetermined shape of the restricting passage. Thus, the vibration damping device can stabilize its vibration damping effect based on the flows of the fluid through the restricting passage.

(6) According to a sixth feature of the present invention that includes any one of the first to fifth features (1) to (5), the first and second mounting members comprises an axial member, and a tubular member provided outside the axial member, the elastic rubber body being interposed between the axial member and the tubular member so as to define the fluid chamber between respective surfaces of the axial and tubular members that are opposed to each other in a radial direction thereof, the working member being supported by one of the axial and tubular members such that the working member extends, in the fluid chamber, in a direction perpendicular to the radial direction.

The fluid-filled vibration damping device according to the sixth feature (6) is advantageously applicable to a cylindrical-type fluid-filled vibration damping device that may be used as, e.g., an engine mount for an FF-type automotive vehicle.

(7) According to a seventh feature of the present invention that includes any one of the first to sixth features (1) to (6), the width of the fluid-flow restricting passage changes in the circumferential direction of the working member, the two first fluid-flow portions of the restricting passage comprising two narrow fluid-flow portions, the two second fluid-flow portions comprising two wide fluid-flow portions the width of each of which is greater than the width of each of the two narrow fluid-flow portions. In the present fluid-filled vibration damping device, the difference between the length of each first (narrow) fluid-flow portion and the length of each second (wide) fluid-flow portion may be decreased, or even zeroed. In the case where the length of each first (narrow) fluid-flow portion is equal to that of each second (wide) fluid-flow portion, the present vibration damping device can be produced at low cost.

(8) According to an eighth feature of the present invention that includes the seventh feature (7), the length of the fluid-flow restricting passage does not change over an entirety thereof, so that the length of each of the two narrow fluid-flow portions and the two wide fluid-flow portions does not change over an entirety thereof and so that the the length $L_s$ of the each narrow fluid-flow portion is substantially equal to the length $L_w$ of the each wide fluid-flow portion. In this vibration damping device, the working member can have a simple structure and accordingly can be produced at low cost. In addition, the flows of the fluid through the fluid-flow restricting passage can be stabilized as a whole. Thus, the present vibration damping device can exhibit a generally flat, low dynamic spring characteristic in a wide frequency range.

(9) According to a ninth feature of the present invention that includes any one of the first to eighth features (1) to (8), each of the two first fluid-flow portions of the fluid-flow restricting passage is defined by, and between, an outer circumferential surface of the working member and an inner circumferential surface of the fluid-chamber wall that are opposed to each other, and wherein the width of the each first fluid-flow portion in the first direction does not change over an entirety thereof in the circumferential direction of the working member.

In the fluid-filled vibration damping device according to the ninth feature (9), the flows of the fluid through the first fluid-flow portions are stabilized and accordingly the low dynamic spring effect based on the flows of the fluid is advantageously exhibited. In this case, the width of each second fluid-flow portion in the first direction may change in the circumferential direction of the working member. If the width of each first fluid-flow portion that does not change over its entirety in the circumferential direction is narrower than that of each second fluid-flow portion, the fluid-flow restricting passage can be tuned to a target frequency by selecting the greatest possible minimum value as the distance between the respective opposed portions of the outer surface of the working member and the inner surface of the fluid-chamber wall.

(10) According to a tenth feature of the present invention that includes any one of the first to ninth features (1) to (9), the working member has an outer circumferential surface having a first diameter, and the fluid-chamber wall has an inner circumferential surface which has a second diameter greater than the first diameter and which cooperates with the outer circumferential surface of the working member to define an annular gap which extends over an entirety thereof with a substantially constant width, in the circumferential direction of the working member, and wherein the working member has a pair of through-holes which are formed through a thickness thereof such that the two through-holes are opposed to each other in a radial direction of the working member, each of the two second fluid-flow portions comprising a corresponding one of the two through-holes and a portion of the annular gap that is located outside the one through-hole, each of the two first fluid-flow portions comprising a portion of the annular gap that is located outside a corresponding one of a pair of two hole-free portions of the working member that are free of the through-holes.

In the fluid-filled vibration damping device according to the tenth feature (10), the annular gap defined between the outer circumferential surface of the working member and the inner circumferential surface of the fluid-chamber wall extends with a substantially constant width in the circumferential direction of the working member. Accordingly, for example, when the vibration damping device receives vibrational loads in respective directions other than the direction in which it receives the main vibration load, the working member is effectively prevented from unnecessary contact with a tubular portion of the fluid-chamber wall. In addition, the working member can be assembled with the first and second mounting members and the elastic rubber body, without needing to taking, into account, the orientation of the working member relative to the other members. Thus, the production efficiency is improved. The fluid-filled vibration damping device according to the tenth feature (10) can enjoy a more advantageous construction when additionally including the seventh feature (7).

(11) According to an eleventh feature of the present invention that includes any one of the first to tenth features (1) to (10), the fluid-chamber wall has a cylindrical inner surface having a predetermined diameter, and the working member includes a pair of first radial portions each of which has an outer surface having a first radius of curvature, and a pair of second radial portions each of which has an outer surface having a second radius of curvature greater than the first radius of curvature, each of the two first fluid-flow portions being defined by, and between, the outer surface of a corresponding one of the two first radial portions and the cylindrical inner surface of the fluid-chamber wall, each of the two second fluid-flow portions being defined by the outer surface of a corresponding one of the two second radial portions and the cylindrical inner surface of the fluid-chamber wall.

In the fluid-filled vibration damping device according to the eleventh feature (11), for example, when a vibrational load input in the direction in which the two second fluid-flow portions are opposed to each other is greater than a vibrational load input in the direction in which the two first fluid-flow portions are opposed to each other, the working member is effectively prevented, upon reception of the greater vibrational load, from unnecessary contact with a tubular portion of the fluid-chamber wall. The fluid-filled vibration damping device according to the eleventh feature (11) can enjoy a more advantageous construction when additionally including the seventh feature (7).

(12) According to a twelfth feature of the present invention that includes any one of the first to eleventh features (1) to (11), the second mounting member provides a rigid tubular portion of the fluid-chamber wall, such that the rigid tubular portion is spaced from an outer surface of the working member in the first direction, and wherein the fluid-filled vibration damping device further comprises a cushion rubber layer which is provided on at least one of the outer surface of the working member and an inner surface of the rigid tubular portion that are opposed to each other, a relative movement between the first and second mounting members in the first direction being limited by abutting contact of the working member with the rigid tubular portion via the cushion rubber layer.

The fluid-filled vibration damping device according to the twelfth feature (12) has a built-in stopper mechanism which limits, based on the abutting contact of the working member with the rigid tubular portion via the cushion rubber layer, the relative movement between the first and second mounting members. The built-in stopper mechanism does not need any additional members and enjoys a high degree of compactness.

(13) According to a thirteenth feature of the present invention that includes any one of the first to twelfth features (1) to (12), the fluid-filled vibration damping device further comprises, in addition to the fluid chamber as a primary fluid chamber, an auxiliary fluid chamber which produces, upon application of the main vibrational load to the vibration damping device, a pressure difference with respect to the primary fluid chamber; and an orifice passage which communicates the primary and auxiliary fluid chambers with each other.

The fluid-filled vibration damping device according to the thirteenth feature (13) can exhibit an excellent vibration damping effect based on the flows of the fluid through the orifice passage, in particular, the resonance of the fluid flowing through the orifice passage. In the case where the orifice passage is tuned to a frequency range different from those to which the first and second fluid-flow portions defined by the working member are tuned, the vibration damping device can exhibit an excellent vibration damping effect against vibrations in a wider frequency range. In order to obtain more advantageously the respective vibration damping effects based on the first and second fluid-flow portions, it is preferred that the orifice passage is tuned to a frequency range lower than those to which the first and second fluid-flow portions are tuned.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Figure 1:
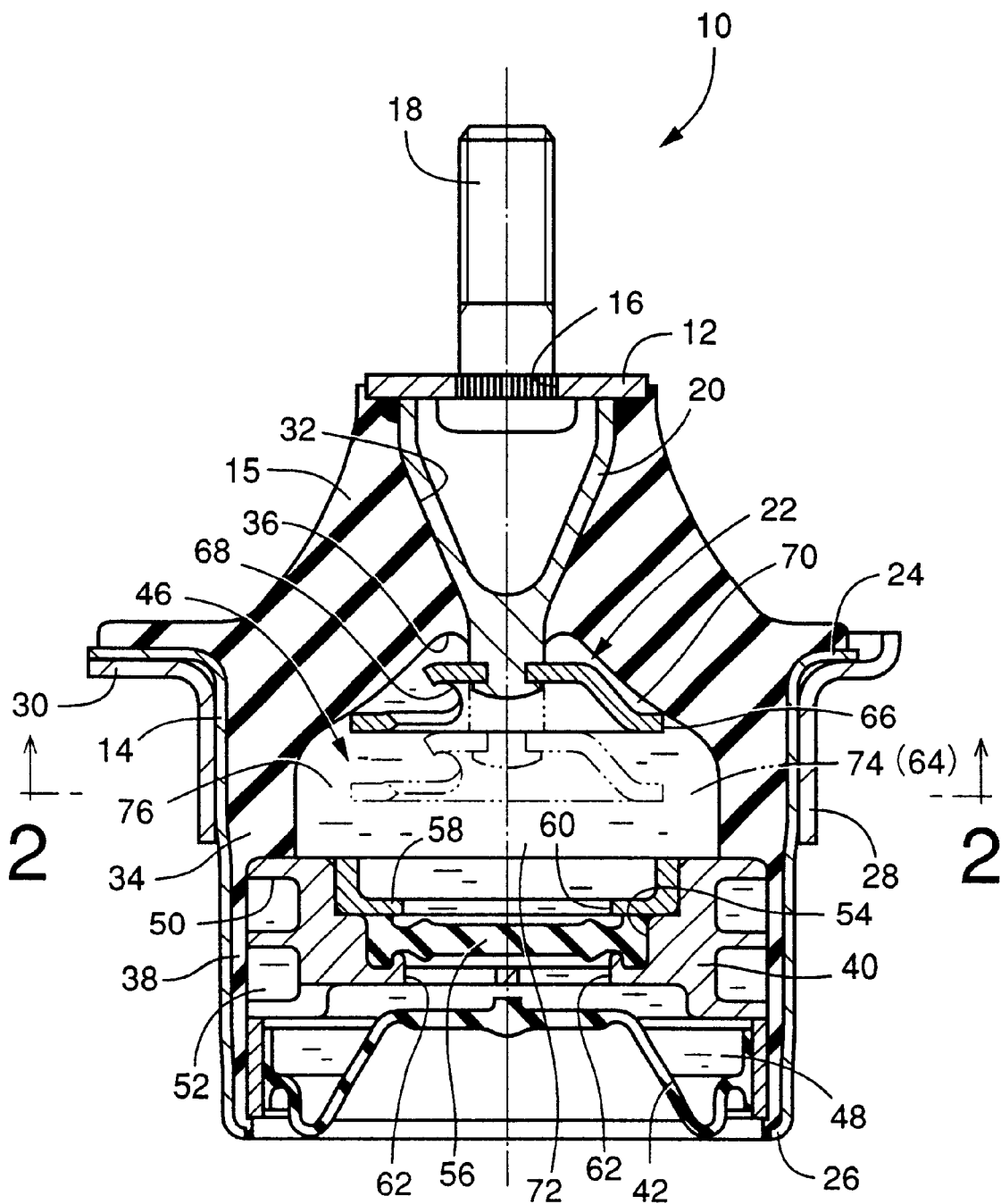
FIG. 1 is a longitudinal cross section view of an engine mount as a first embodiment of the present invention, taken along 1—1 in FIG. 2.
Figure 2:
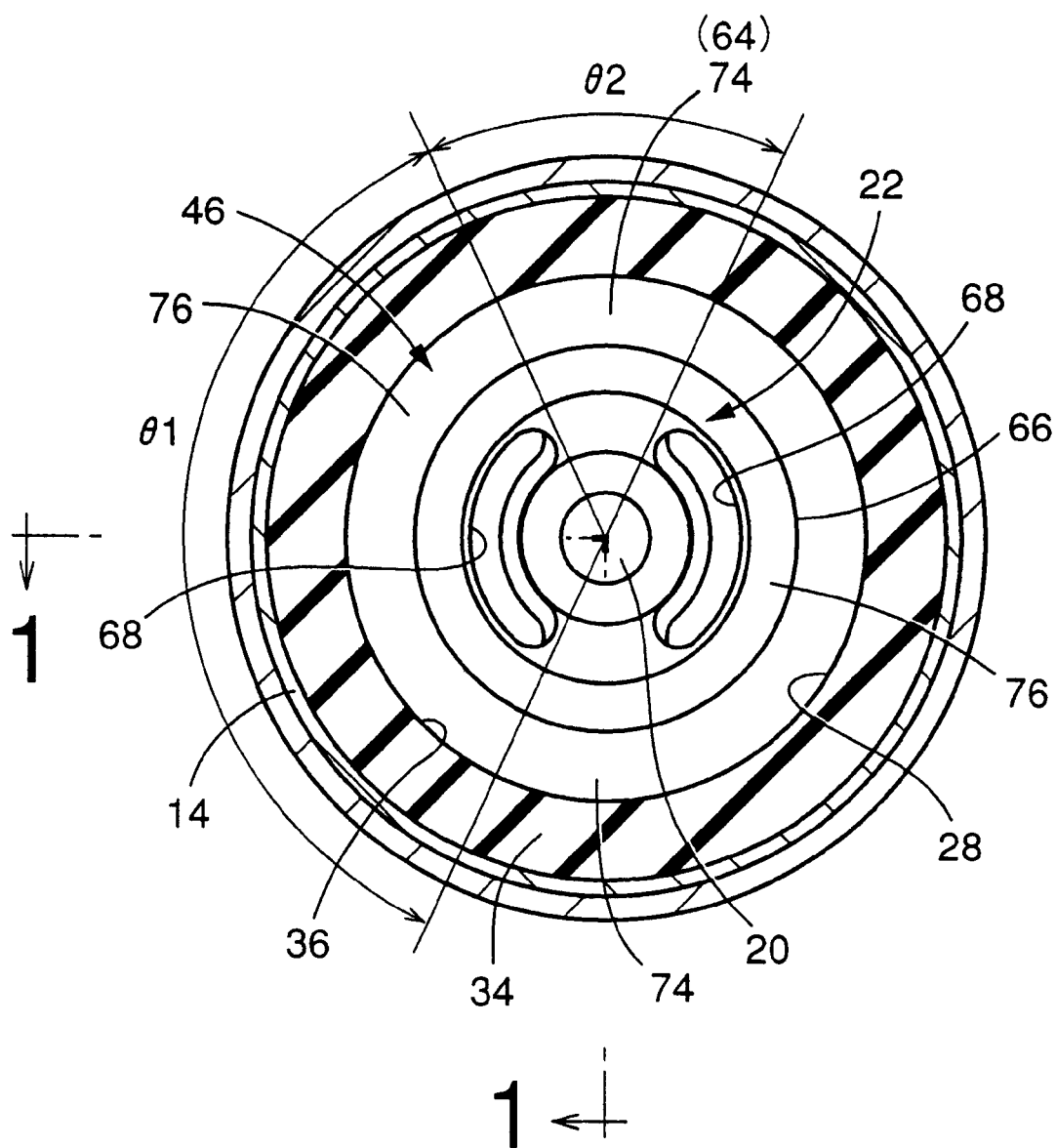
FIG. 2 is a transverse cross section view of the engine mount of FIG. 1, taken along 2—2 in FIG. 1.

FIGS. 1 and 2 show an engine mount 10 for use in an automotive vehicle. The engine mount 10 includes a first mounting member 12 formed of metal, a second mounting member 14 formed of metal, and an elastic rubber body 15 which elastically connects the first and second mounting members 12, 14 to each other. The first mounting member 12 is attached to the power unit (not shown) of the automotive vehicle, and the second mounting member 14 is attached to the body (not shown) of the vehicle, so that the engine mount 10 supports the power unit on the vehicle's body in a vibration damping fashion. In this state, a main vibrational load is input to the engine mount 10 in a direction in which the first and second mounting members 12, 14 are opposed to each other, that is, in a vertical direction as seen in FIG. 1.

More specifically described, the first mounting member 12 is provided by a rigid member which is formed of metal or the like and has a disc-like shape. A generally inverted-conical support member 20 formed of metal is fixed by welding to the first mounting member 12, so as to project axially downward from the same 12. A working member in the form of umbrella-shaped member 22 formed of metal is fixed by caulking to an axially lower end portion of the support member 20. The umbrella member 22 has a generally disc-like shape, and has a central through-hole which is formed through the thickness of a central portion of the member 22 and in which the lower end portion of the support member 20 is inserted to be fixed by caulking to the umbrella member 22. Thus, the umbrella member 22 extends along a plane perpendicular to a central axis of the support member 20. The first mounting member 12 has a central through-hole 16 which is formed through the thickness of a central portion of the member 12 and in which a fixing bolt 18 is press-fitted to project upward from the member 12, as seen in FIG. 1. With the fixing bolt 18, the first mounting member 12 is attached to the power unit of the vehicle.

The second mounting member 14 is provided by a rigid member which is formed of metal or the like and which has a generally cylindrical shape having a large diameter. The second mounting member 14 is spaced from the first mounting member 12 in a direction parallel to a central axis of the member 12. The second mounting member 12 includes an integral flange portion 24 which extends radially outward from an upper one of axially opposite open ends of the member 12, and includes an integral engaging portion 26 which is somewhat bent radially inward from the lower open end of the member 12. The second mounting member 14 is press-fitted in a rigid bracket 28 having a thick-walled cylindrical shape having a large diameter, and is attached to the body of the vehicle, with the bracket 28 being fixed to the body with fixing bolts or the like. The bracket 28 includes an integral flange portion 30 which extends radially outward from one of axially opposite ends of the bracket 28. Since the flange portion 24 of the second mounting member 14 is superposed on the flange portion 30 of the bracket 28, the engine mount 10 enjoys an excellent withstand-load strength with respect to the direction in which the load of the power unit is applied to the engine mount 10.

The elastic rubber body 15 is interposed between the first and second mounting members 12, 14. The rubber body 15 has a generally thick-walled, tapered, cylindrical shape whose central portion is tapered in its axially upward direction. Thus, the rubber body 15 has a generally frustoconical, outer circumferential surface. The first mounting member 12 is vulcanized to a small-diameter, axially upper end surface of the rubber body 15, and an inner circumferential surface of the upper end portion of the second mounting member 14 is vulcanized to an outer circumferential surface of a large-diameter, axially lower end portion of the rubber body 15. The support member 20 welded to the first mounting member 12 extends through a central bore 32 of the rubber body 15 and is vulcanized to an inner surface of the rubber body 15 that defines the central bore 32. Thus, in the present embodiment, the first and second mounting members 12, 14 and the elastic rubber body 15 are manufactured in the form of an integrally vulcanized product.

The elastic rubber body 15 is continuous with its integral portion which extends over a substantially entire inner circumferential surface of the second mounting member 14. The integral portion includes a thick-walled tubular rubber wall 34 as a buffer or cushion rubber which covers the axially upper half portion of the inner surface of the second mounting member 14. The rubber body 15 and the rubber wall 34 cooperate with each other to define a generally cylindrical void 36 opening downward. The lower end portion of the support member 20 projects into the void 36 from the center of an upper surface (i.e., bottom surface) of the void 36. Thus, the umbrella member 22 supported by the support member 20 is located in the void 36. The above-indicated integral portion additionally includes a thin-walled seal rubber layer 38 which covers the axially lower half portion of the inner surface of the second mounting member 14. Thus, the elastic rubber body 15, the tubular rubber wall 34, and the seal rubber layer 38 are formed integrally with one another.

A partition member 40 and a diaphragm 42 are inserted in the order of description through the axially lower open end of the second mounting member 14, and are assembled with the integrally vulcanized product. The partition member 40 is provided by a rigid member which is formed of synthetic resin, metal such as aluminum alloy, or the like and which has a generally disc-like shape. The diaphragm 42 is provided by a thin rubber sheet which is easily elastically deformable. A cylindrical fitting ring 44 is vulcanized to an outer circumferential surface of the diaphragm 42. After the partition member 40 and the diaphragm 42 are inserted in the second mounting member 14 and are located in the axially lower half portion of the second mounting member 14 that is covered with the seal rubber layer 38, the second mounting member 14 is subjected to a diameter-reducing operation such as eight-die-using drawing. Thus, the partition member 40 and the diaphragm 42 (or the ring 44) are assembled with the above-indicated vulcanized product.

Accordingly, the axially lower open end of the second mounting member 14 is fluid-tightly closed by the diaphragm 42, so as to define, in the second mounting member 14, a fluid-filled space which is air-tightly isolated from the ambient air and is filled with a non-compressible fluid. The non-compressible fluid may be selected from among water, alkylene glycol, polyalkylene glycol, silicone oil, or a mixture of two or more of them. However, in order to obtain an excellent vibration-damping effect based on resonance of the fluid, it is preferred that the fluid has a low viscosity of not more than 0.1 Pa·s. Filling the space with the non-compressible fluid is advantageously carried out by, for example, assembling the partition member 40 and the diaphragm 42 with the vulcanized product, in a tank filled with the fluid.

The fluid-filled space is divided into upper and lower fluid-filled spaces by the partition member 40. The upper fluid-filled space that is partly defined by the elastic rubber body 15 provides a pressure receiving chamber 46 as a primary fluid chamber whose pressure changes upon application of a vibrational load to the engine mount 10. The lower fluid-filled space that is partly defined by the diaphragm 42 provides an equilibrium chamber 48 as an auxiliary fluid chamber whose volume easily changes because of elastic deformation of the diaphragm 42, thereby absorbing the change of pressure of the pressure receiving chamber 46.

The partition member 40 has a generally spiral groove 50 which is continuously formed in an outer circumferential surface of the member 40 and opens in the outer surface. The spiral groove 50 is closed by the second mounting member 14 via the seal rubber layer 38, so as to define an orifice passage 52 which communicates the pressure receiving chamber 46 and the equilibrium chamber 48 with each other. Upon application of a vibrational load to the engine mount 10, a pressure difference is produced between the two chambers 46, 48, so that the fluid flows through the orifice passage 52 and thereby exhibits a certain vibration damping effect. In the present embodiment, the cross-section area, length, etc. of the orifice passage 52 are so determined as to exhibit, based on the resonance of the fluid flowing through the passage 52, an excellent vibration damping effect against a low-frequency vibration such as engine shake.

The partition member 40 has a generally cylindrical central hole 54 which opens in an upper surface thereof, and an elastically deformable rubber plate 56 is accommodated in the central hole 54. The rubber plate 56 is assembled with the partition member 40 in such a manner that an outer peripheral portion of the plate 56 is fluid-tightly sandwiched by a bottom surface of the central hole 54 and an annular hold-down ring 58 fixedly fitted in an axially upper open end of the central hole 54. In this state, a central portion of the upper surface of the rubber plate 56 is exposed to the fluid present in the pressure receiving chamber 46 via a central aperture 60 of the ring 58. Meanwhile, a central portion of the lower surface of the rubber plate 56 is exposed to the fluid present in the equilibrium chamber 48 via a plurality of communication holes 62 formed through the thickness of a bottom wall of the partition member 40 that defines the bottom surface of the central hole 54. Thus, the upper and lower surfaces of the rubber plate 56 receive the respective fluid pressures in the two chambers 46, 48. Therefore, upon application of a vibrational load to the engine mount 10, the rubber plate 56 is elastically deformed because of a pressure difference produced between the two chambers 46, 48. The elastic deformation of the rubber plate 56 causes flows of the fluid through the central aperture 60 of the ring 58 and the communication holes 62 of the partition member 40, so that the engine mount 10 exhibits, based on the resonance of the fluid and the pressure absorbing effect of the pressure receiving chamber 46, a low dynamic spring effect against input vibrations having frequencies in a predetermined frequency range. In the present embodiment, the spring characteristic of the rubber plate 56 and the cross-section area, fluid-flow length, etc. of the fluid passages are so predetermined that the engine mount 10 exhibits, based on flows of the fluid caused by the elastic deformation of the rubber plate 56, an excellent vibration damping effect against a medium- or high-frequency vibration such as idling vibration or low-speed booming noise. In addition, the amount of elastic deformation of the rubber plate 56 is limited by its elasticity and its contact with the bottom surface of the central hole 54. Therefore, when a low-frequency, large-amplitude vibration such as engine shake is input to the engine mount 10, the amount of flow of the fluid caused by the elastic deformation of the rubber plate 56 remains small, whereas the flow of the fluid through the orifice passage 52 is permitted in sufficient amount.

In the pressure receiving chamber 46 whose wall is partly provided by the elastic rubber body 15, the umbrella-shaped member 22 extends along a plane perpendicular to the vibration-input direction in which a main vibrational load is input to the engine mount 10, that is, the direction parallel to the central axis of the engine mount 10 (i.e., the vertical direction as seen in FIG. 1) In the state in which the power unit is mounted on the engine mount 10, the rubber body 15 is deformed or compressed by the weight of the power unit, so that the umbrella member 22 is moved downward from a state indicated at solid lines in FIG. 1, to a state indicated at phantom lines in which the umbrella member 22 is located in the center of the pressure receiving chamber 46. Thus, the umbrella member 22 divides the chamber 46 into upper and lower divided chambers 70, 72 located on opposite sides of the umbrella member 22 in the vibration-input direction, i.e., the axial direction of the engine mount 10. The upper and lower divided chambers 70, 72 are communicated with each other via an annular gap 64 which is defined by, and between, respective opposed portions of an outer circumferential surface of the umbrella member 22 and an inner circumferential surface of the tubular rubber wall 34 that are opposed to each other in all radial directions of the engine mount 10. The inner surface of the tubular rubber wall 34 partly defines the chamber 46. The annular gap 64 extends continuously all around in a circumferential direction of the umbrella member 22.

In the present embodiment, the umbrella member 22 has a generally skirt-like or tapered shape which is tapered toward its central, upper portion at which the umbrella member 22 is fixed by caulking to the support member 20. The umbrella member 22 includes an outer peripheral, lower portion which has an annular plate-like shape and which extends radially outward from the skirt-like or tapered portion thereof. The outer peripheral portion of the umbrella member 22 has a cylindrical outer surface 66 which is concentric with a central axis of the support member 20, i.e., a central axis of the pressure receiving chamber 46. The inner surface of the tubular rubber wall 34 that partly defines the chamber 46 in which the umbrella member 22 is provided, is also cylindrical and is also concentric with the central axis of the chamber 46. Therefore, the annular gap 64 defined by, and between, the respective opposed portions of the outer circumferential surface of the umbrella member 22 and the inner circumferential surface of the tubular rubber wall 34 extends continuously all around in the circumferential direction of the umbrella member 22, with a substantially constant dimension in all radial directions of the same 22, as shown in FIG. 2.

The umbrella member 22 has a pair of through-holes 68 which are formed through the thickness of a radially intermediate portion thereof, i.e., the skirt-like or tapered portion thereof. The two through-holes 68 are opposite to each other in a diametric direction of the umbrella member 22. Each of the two through-holes 68 has a predetermined length in the circumferential direction of the umbrella member 22, and a predetermined width in the radial direction of the same 22. Each through-hole 68 extends over not more than 180 degrees about a central axis of the umbrella member 22. In the present embodiment, each through-hole 68 extends over an angle, $\theta_1 = 125$ degrees (FIG. 2), about the central axis of the umbrella member 22. However, the angle $\theta_1$ may be selected from the range of 100 degrees to 150 degrees. Thus, the umbrella member 22 includes two hole-free portions which are free of the through-holes 68 and which are opposite to each other in a diametric direction of the member 22 that is perpendicular to the diametric direction in which the two through-holes 68 are opposite to each other. Each hole-free portion extends over an angle, $\theta_2 = 55$ degrees, about the central axis of the umbrella member 22. However, the angle $\theta_2$ may be selected from the range of 80 degrees to 30 degrees.

Figure 3:
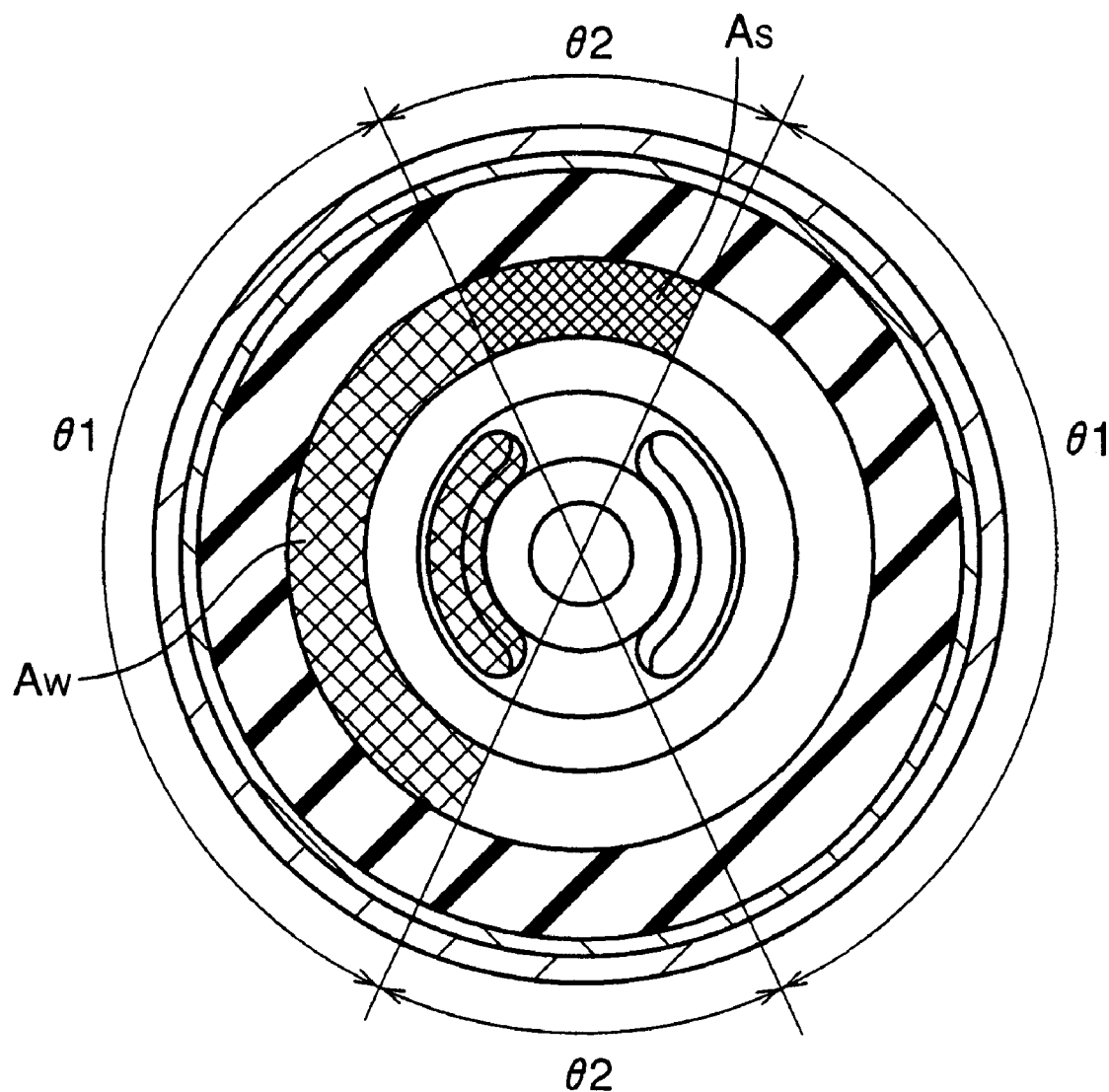
FIG. 3 is a transverse cross section view corresponding to FIG. 2, for explaining a fluid-flow restricting passage of the engine mount of FIG. 1.

Thus, in two sectorial ranges about the central axis of the umbrella member 22 where no through-holes 68 are provided, having the respective angles $\theta_2$ as shown in FIG. 3, the upper and lower divided chambers 70, 72 are communicated with each other via only two corresponding narrow portions of the annular gap 64, respectively. The two narrow portions of the annular gap 64 provide two narrow fluid-flow portions 74 as two first fluid-flow portions, respectively. Meanwhile, in two sectorial ranges about the central axis of the umbrella member 22 where the two through-holes 68 are provided, having the respective angles $\theta_1$ as shown in FIG. 3, the two divided chambers 70, 72 are communicated with each other via the two through-holes 68 and two corresponding wide portions of the annular gap 64, respectively. Each of the two through-holes 68 and a corresponding one of the two wide portions of the annular gap 64 cooperate with each other to provide a corresponding one of two wide fluid-flow portions 76 as two second fluid-flow portions. In FIG. 3, each narrow fluid-flow portion 74 is indicated at fine hatching, and each wide fluid-flow portion 76 is indicated at coarse hatching, for easier understanding purposes.

A length of each narrow or wide fluid-flow portion 74, 76 in the circumferential direction of the umbrella member 22, a cross-section area, $A_s$ (indicated at fine hatching in FIG. 3), of each narrow fluid-flow portion 74, and a cross-section area, $A_w$ (indicated at coarse hatching in FIG. 3), of each wide fluid-flow portion 76 can be adjusted by changing the length of each through-hole 68 in the circumferential direction of the member 22. In addition, the cross-section area $A_w$ of each wide fluid-flow portion 76 can be adjusted by changing the width of each through-hole 68 in the radial direction of the umbrella member 22. A length, $L_s$, of each narrow fluid-flow portion 74 in the axial direction of the engine mount 10, the cross-section area $A_s$ of each narrow fluid-flow portion 74, a length, $L_w$, of each wide fluid-flow portion 76 in the axial direction of the engine mount 10, and the cross-section area $A_w$ of each wide fluid-flow portion 76 satisfy the following expression:

$$1/10 \leq (A_s/L_s)/(A_w/L_w) \leq 1/2$$

In the present embodiment, the above-indicated ratio, $(A_s/L_s)/(A_w/L_w)$, is substantially equal to $1/3$. The length $L_s$ of each narrow fluid-flow portion 74 and the length $L_w$ of each wide fluid-flow portion 76 are equal to each other, and is equal to the dimension of the cylindrical outer surface 66 of the outer peripheral portion of the umbrella member 22, shown in FIG. 1, in the axial direction of the engine mount 10.

In the present engine mount 10 in which the narrow and wide fluid-flow portions 74, 76 are defined by the umbrella member 22 and the tubular rubber wall 34, the umbrella member 22 is reciprocatively or periodically moved, upon reception of a vibrational load, in the pressure receiving chamber 46, so that the fluid flows between the upper and lower divided chambers 70, 72 via the one pair of narrow fluid-flow portions 74, 74 and the one pair of wide fluid-flow portions 76, 76. The two narrow fluid-flow portions 74, 74 and the two wide fluid-flow portions 76, 76 cooperate with one another to provide a fluid-flow restricting passage. The engine mount 10 exhibits a certain vibration damping effect based on the flows of the fluid through the fluid-flow restricting passage.

The frequency range in which the engine mount 10 exhibits a low dynamic spring effect based on the resonance of the fluid flowing through the fluid-flow restricting passage can be tuned by changing the ratio, A/L, of cross-section area, A, to length, L of the restricting passage while taking, into account, the spring hardness of the wall of the pressure receiving chamber 46, the density of the fluid enclosed, etc. The ratio A/L of cross-section area A to length L of the restricting passage consisting of the narrow and wide fluid-flow portions 74, 76 is designed to change in the circumferential direction of the umbrella member 22. Since the two narrow fluid-flow portions 74, 74 are opposite to each other in one of two diametric directions of the umbrella member 22 and the two wide fluid-flow portions 76, 76 are opposite to each other in the other diametric direction, the low dynamic spring effect based on the resonance of the fluid flowing through the narrow portions 74 and the low dynamic spring effect based on the resonance of the fluid flowing through the wide portions 76 can be obtained in different frequency ranges, respectively. Thus, the frequency range to which the restricting passage is tuned relates to not the total cross-section area of the restricting passage calculated regarding the circumferential direction of the umbrella member 22, but the total cross-section area of the restricting passage calculated regarding each radial direction of the umbrella member 22. That is, although the restricting passage is entirely continuous in the circumferential direction of the umbrella member 22, different portions or areas of the restricting passage that have different total cross-section areas in respective radial directions provide different fluid passages. The reason for this has not been technically elucidated. It is, however, thought that the reason relates to the mode of vibration of the elastic rubber body 15 connecting between the first and second mounting members 12, 14, that is, the manner of elastic deformation of the rubber body 15 upon reception of a vibrational load. This thought is supported by the fact that the accuracy of tuning of frequency and the degree of vibration damping effect based on the resonance of the fluid are improved by forming the narrow and wide fluid-flow portions 74, 76 such that the pair of narrow portions 74 with a same first ratio A/L are opposite to each other in one of two diametric directions perpendicular to each other and the pair of wide portions 76 with a same second ratio A/L are opposite to each other in the other diametric direction. In the present embodiment, the two narrow fluid-flow portions 74, 74 have a same fluid-passage shape, that is, a same fluid-flow cross-section area, a same fluid-flow cross-section shape, and a same fluid-flow length, and the two wide fluid-flow portions 76 have a same fluid-passage shape.

The engine mount 10 constructed as described above exhibits an excellent vibration damping effect by obtaining a low dynamic spring effect based on the resonance of the fluid flowing between the upper and lower divided chambers 70, 72, in different frequency ranges, that is, the first frequency range to which the narrow fluid-flow portions 74 are tuned and the second frequency range to which the wide fluid-flow portions 76 are tuned. It is preferred that the narrow and wide fluid-flow portions 74, 76 are tuned to respective frequency ranges each of which is higher than the frequency range (including, e.g., high-speed booming noise) in which the mount 10 exhibits a vibration damping effect based on the flows of the fluid caused by the elastic deformation of the rubber plate 56. In this case, the present engine mount 10 can exhibit an excellent vibration damping effect against input vibrations having frequencies in a wider frequency range, and can exhibit an improved vibration damping effect based on the flows of the fluid through the narrow and wide fluid-flow portions 74, 76 of the fluid-flow restricting passage.

Each of the two narrow fluid-flow portions 74 extends over the second angle θ2 ranging from 30 degrees to 80 degrees about the central axis of the umbrella member 22 that is smaller than the first angle θ1 ranging from 150 degrees to 100 degrees over which each of the two wide fluid-flow portions 76 extends. Therefore, even if the engine mount 10 receives a vibration in a higher frequency range than that to which the narrow fluid-flow portions 74 are tuned, the engine mount 10 is prevented from exhibiting a high dynamic spring characteristic resulting from otherwise increased resistance to the flows of the fluid through the narrow portions 74. Rather, the engine mount 10 exhibits a low dynamic spring characteristic based on the flows of the fluid through the wide fluid-flow portions 76.

In the engine mount 10, the ratio $(A_s/L_s)/(A_w/L_w)$ of the first ratio $(A_s/L_s)$ of each narrow fluid-flow portion 74 to the second ratio $(A_w/L_w)$ of each wide fluid-flow portion 76 is not smaller than $1/10$ and is not greater than $1/2$. Therefore, owing to the low dynamic spring effect based on the resonance of the fluid flowing through the narrow and wide fluid-flow portions 74, 76, the engine mount 10 exhibits a generally flat distribution of its spring constant in a sufficiently wide frequency range, without raising the spring constant in any specific frequency ranges. In the present embodiment, the length $L_s$ of each narrow portion 74 is substantially constant over an entirety thereof in the circumferential direction of the umbrella member 22, and the length $L_w$ of each wide portion 76 is substantially constant over an entirety thereof in the same direction. In addition, the length $L_s$ of each narrow portion 74 is equal to the length $L_w$ of each wide portion 76. Therefore, the narrow and wide fluid-flow portions 74, 76 can be easily tuned to respective desirable frequency ranges, and the fluid can flow with stability between the upper and lower divided chambers 70, 72.

Moreover, when the engine mount 10 receives a load in a diametric direction thereof perpendicular to the axial direction thereof, the umbrella member 22 may be brought into abutting contact with the second mounting member 14 via the tubular rubber wall 34 as the buffer or cushion member, so that the relative movement between the first and second mounting members 12, 14 in the diametric direction may be limited. Since the umbrella member 22 has the cylindrical outer surface 66 having the predetermined radius about the central axis of the member 22, the annular gap 64 extends with a constant width over its entirety in the circumferential direction of the member 22. Thus, the engine mount 10 has the advantage that the umbrella member 22 can be assembled with the other members 12, 14, 15 without having to specifying an angular position or phase of the member 22 relative to the same 12, 14, 15.

Figure 4:
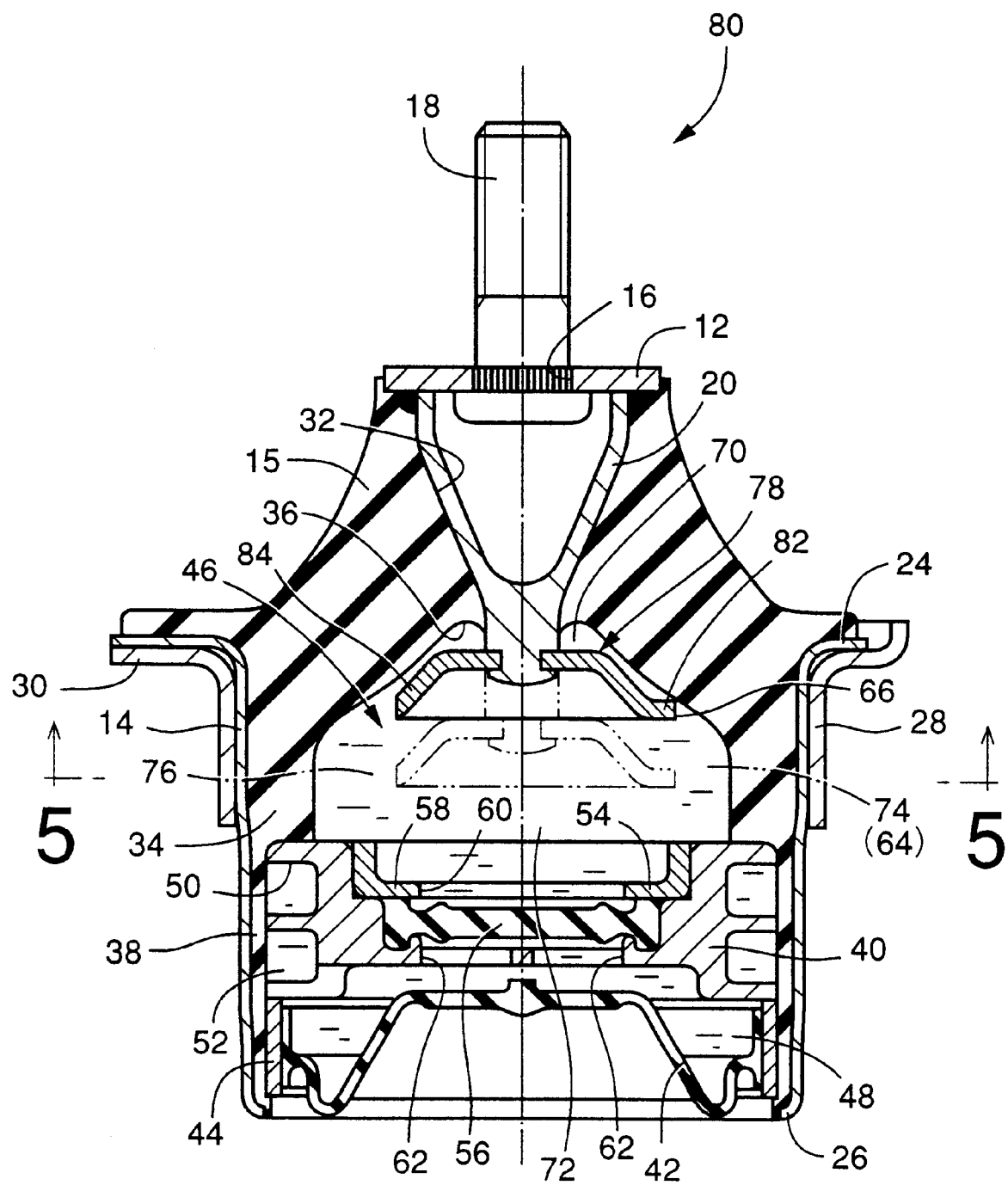
FIG. 4 is a longitudinal cross section view of another engine mount as a second embodiment of the present invention, taken along 4—4 in FIG. 5.
Figure 5:
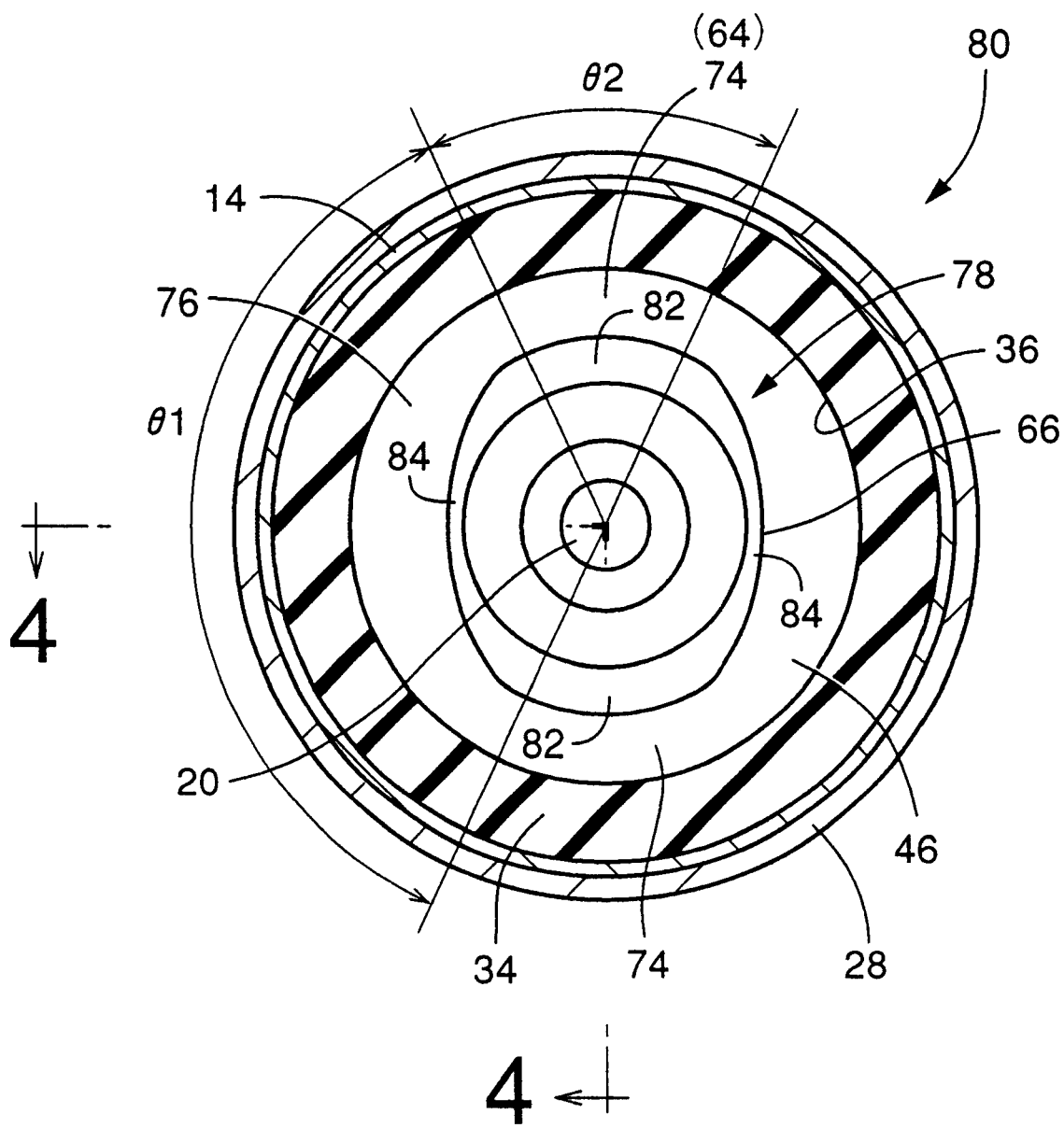
FIG. 5 is a transverse cross section view of the engine mount of FIG. 4, taken along 5—5 in FIG. 4.

FIGS. 4 and 5 show an automotive-vehicle engine mount 80 as a second embodiment of the present invention. The second engine mount 80 is basically identical with the first engine mount 10 shown in FIGS. 1 to 3, but is different from the first mount 10 in that the second mount 80 includes an umbrella-shaped member 78 different from the umbrella-shaped member 22 of the first mount 10. The same reference numerals as used for the first mount 10 shown in FIGS. 1 to 3 are used to designate the corresponding elements and parts of the second mount 80, and the detailed description thereof is omitted.

A radial dimension of the umbrella member 78 of the second engine mount 80 changes in a circumferential direction of the member 78. That is, the umbrella member 78 includes a pair of large-radius portions 82, 82 which are opposite to each other in one of two diametric directions of the umbrella member 78 (i.e., in the vertical direction as seen in FIG. 5), and a pair of small-radius portions 84, 84 which are opposite to each other in the other diametric direction (i.e., in the horizontal direction as seen in FIG. 5). Each large-radius portion 82 has a radial dimension larger than that of each small-radius portion 84. Each large-radius portion 82 has an outer circumferential surface which is opposed to the inner circumferential surface of the cushion rubber wall 34 and which has a generally constant first radius of curvature, and each small-radius portion 84 has an outer circumferential surface which is opposed to the inner circumferential surface of the rubber wall 34 and which has a generally constant second radius of curvature larger than the first radius of curvature. The outer circumferential surface of the umbrella member 78 that is opposed to the inner circumferential surface of the rubber wall 34 has no radial steps but has four points where the radius of curvature of the outer surface changes. The respective outer circumferential surfaces of the two large-radius portions 82 and the two small-radius portions 84 are smoothly and continuously connected to one another, such that the respective outer surfaces of the two large-radius portions 82 are alternate with the respective outer surfaces of the two small-radius portions 84 in the circumferential direction of the umbrella member 78.

Each large-radius portion 82 has an outer peripheral portion having a part-cylindrical outer surface 66 which is concentric with the cylindrical inner surface of the cushion rubber wall 34 that partly defines the pressure receiving chamber 46. Thus, a narrow fluid-flow portion 74 is defined by, and between, the outer circumferential surface of each large-radius portion 82 and the inner surface of the rubber wall 34, such that the narrow fluid-flow portion 74 extends in the circumferential direction of the umbrella member 78, with a generally constant width in radial directions of the member 78. Thus, the engine mount 80 has two narrow fluid-flow portions 74 which are opposite to each other in a first diametric direction thereof. Meanwhile, each small-radius portion 84 has an outer peripheral portion having a part-cylindrical outer surface whose radius of curvature is larger than that of the inner surface of the rubber wall 34. Thus, a wide fluid-flow portion 76 is defined by, and between, the outer circumferential surface of each small-radius portion 84 and the inner surface of the rubber wall 34, such that the width of the wide fluid-flow portion 76 takes the greatest value at the middle portion thereof in the circumferential direction of the umbrella member 78 and decreases in opposite directions away from the middle portion. Thus, the engine mount 80 has two wide fluid-flow portions 76 which are opposite to each other in a second diametric direction thereof perpendicular to the first diametric direction. The narrow and wide portions 74, 76 have a same width at respective end portions thereof where the four portions 74, 76 are continuously connected to one another in the circumferential direction of the umbrella member 78.

Figure 6:
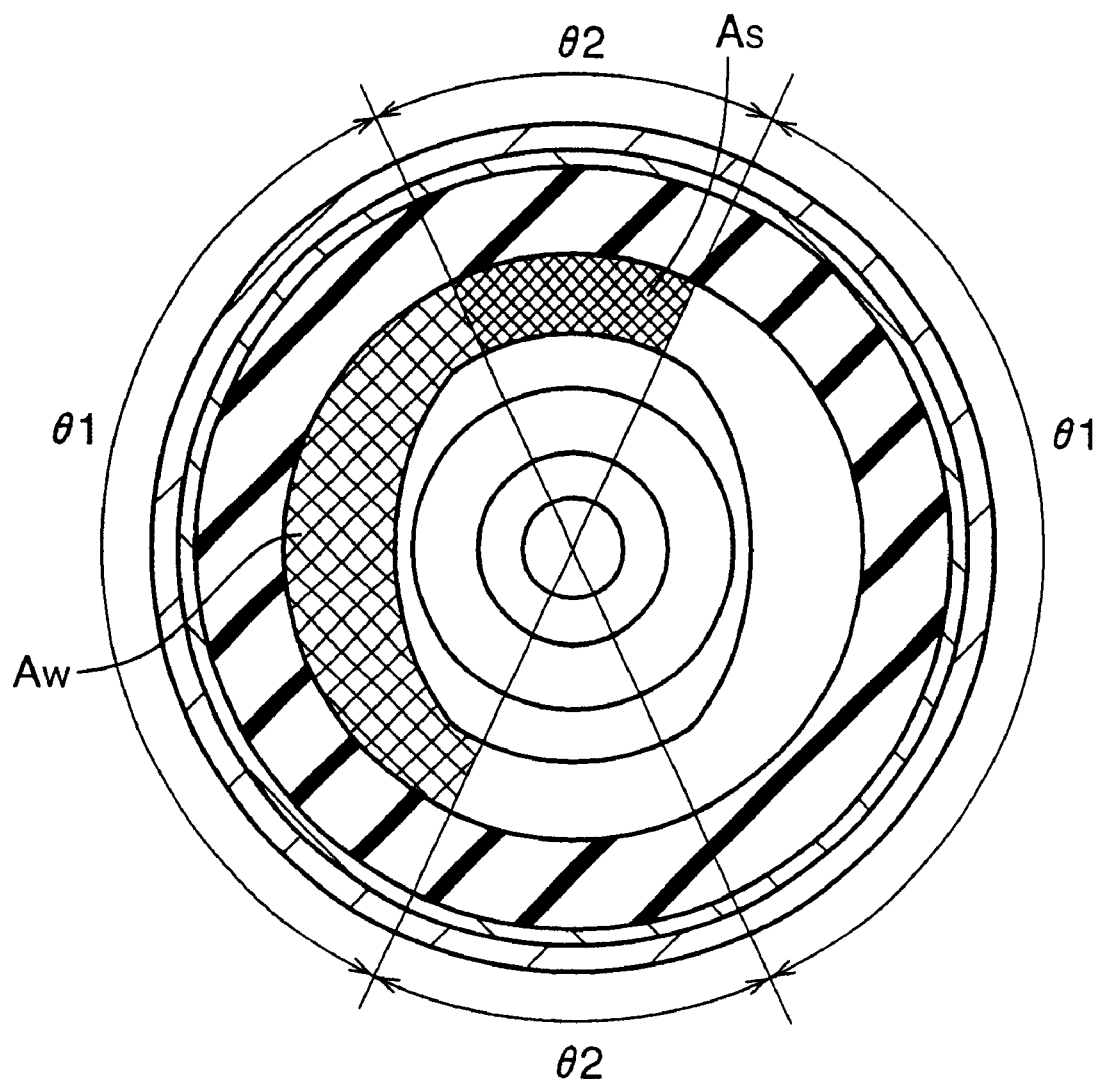
FIG. 6 is a transverse cross section view corresponding to FIG. 5, for explaining a fluid-flow restricting passage of the engine mount of FIG. 4.

As shown in FIG. 6, in the engine mount 80, each wide fluid-flow portion 76 extends over an angle, θ1=130 degrees, about the central axis of the umbrella member 78 or the pressure receiving chamber 46. However, the angle θ1 may be selected from the range of 100 degrees to 150 degrees. In addition, each narrow fluid-flow portion 74 extends over an angle, θ2=50 degrees, about the central axis of the umbrella member 78. However, the angle θ2 may be selected from the range of 80 degrees to 30 degrees. Thus, the cross-section area of the fluid-flow restricting passage defined by the umbrella member 78 and the rubber wall 34 is designed to change in the circumferential direction of the member 78. A length, $L_s$, of each narrow fluid-flow portion 74 in the axial direction of the engine mount 80, a cross-section area, $A_s$ (indicated at fine hatching in FIG. 6), of each narrow fluid-flow portion 74, a length, $L_w$, of each wide fluid-flow portion 76 in the axial direction of the engine mount 80, and a cross-section area, $A_w$ (indicated at coarse hatching in FIG. 6), of each wide fluid-flow portion 76 satisfy the following expression:

$$1/10 \leq (A_s/L_s)/(A_w/L_w) \leq 1/2$$

In the present embodiment, the above-indicated ratio $(A_s/L_s)/(A_w/L_w)$ of the first ratio $(A_s/L_s)$ to the second ratio $(A_w/L_w)$ is substantially equal to 1/3.4. The length $L_s$ of each narrow fluid-flow portion 74 and the length $L_w$ of each wide fluid-flow portion 76 are equal to each other, and is equal to the dimension of the cylindrical outer surface 66 of the outer peripheral portion of the umbrella member 22, shown in FIG. 4, in the axial direction of the engine mount 80.

The second engine mount 80 enjoys the same advantages as those of the first engine mount 10. In particular, the engine mount 80 can exhibit a low dynamic spring characteristic based on the resonance of the fluid flowing between the upper and lower divided chambers 70, 72, in different frequency ranges, that is, the first frequency range to which the narrow fluid-flow portions 74 are tuned and the second frequency range to which the wide fluid-flow portions 76 are tuned. Thus, the engine mount 80 exhibits an excellent vibration damping effect in a widened high frequency range.

In the engine mount 80, the distance between the respective opposed portions of the outer surface of each large-radius portion 82 of the umbrella member 78 and the inner surface of the rubber wall 34 differs from that between the respective opposed portions of the outer surface of each small-radius portion 84 of the umbrella member 78 and the inner surface of the rubber wall 34. Therefore, the engine mount 80 can limit, based on the abutting contact of the umbrella member 78 with the cushion rubber wall 34, the relative movement between the first and second mounting members 12, 14 over different distances or strokes in two diametric directions of the mount 80 in one of which the two large-radius portions 82 are opposite to each other and in the other of which the two small-radius portions 84 are opposite to each other.

While the present invention has been described in its preferred embodiments, the present invention may be otherwise embodied.

For example, in each of the illustrated embodiments, the inner circumferential surface of the tubular rubber wall 34 that partly defines the pressure receiving chamber 46 is cylindrical. However, the inner surface of the rubber wall 34 may have a different shape such as an elliptic, a rectangular, or a polygonal shape, or any other appropriate shape. In addition, the outer circumferential surface of the umbrella member 22, 78 is not limited to a circular or an elliptic shape. For example, it is possible to employ an umbrella member having a circular outer periphery or contour, and a tubular rubber wall having an elliptic inner contour. In the latter case, the cross-section area of an annular gap defined by, and between, respective opposed portions of the inner and outer surfaces of the umbrella member and the rubber wall changes in the circumferential direction of the umbrella member, such that the annular gap consists of two narrow fluid-flow portions which are opposite to each other in one of two diametric directions of the umbrella member that are perpendicular to each other and two wide fluid-flow portions which are opposite to each other in the other diametric direction.

The present invention is advantageously applied to a fluid-filled vibration damping device having such a structure as shown by the engine mounts 10, 80 in each of which the first and second mounting members 12, 14 are spaced from each other on a common axis parallel to the direction in which a main vibrational load is input to the mount 10, 80. In this case, the damping device exhibits an excellent vibration damping effect based on the flows of the fluid through the fluid-flow restricting passage defined by the umbrella member 22, 78. However, the principle of the present invention is applicable to a so-called cylindrical vibration damping device which includes an axial member as the first mounting member, an outer cylindrical member as the second mounting member that is spaced radially outward from the axial member, an elastic rubber body for elastically connecting the axial and cylindrical members to each other, and a fluid-filled chamber provided between the axial and cylindrical members.

The whole portion of the umbrella member 22, 78, or a restricting-passage defining portion (e.g., the outer circumferential surface) of the member 22 that partly defines the fluid-flow restricting passage may be covered with a thick, elastic rubber member. In this case, the cross-section area and length of the restricting passage can be adjusted by changing the thickness of the rubber member. In addition, the umbrella member 22, 78 is protected by the rubber member, when being bought into abutting contact with the other members.

In the second engine mount 80, the radius of curvature of each small-radius portion 84 may be made infinite. That is, each small-radius portion 84 may have an outer surface extending straight or flat.

In the case where the cross-section area A of the fluid-flow restricting passage is adjusted by forming the through-holes 68 in the umbrella member 22, each through-hole 68 may be divided, for the purpose of maintaining a sufficient strength of the umbrella member 22, into a plurality of smaller holes which are arranged in an array in the circumferential direction of the member 22 and each of which has a smaller dimension in the same direction. In this case, the plurality of small holes can be regarded as one through-hole which is substantially continuous in the circumferential direction of the umbrella member 22.

The cross-section area of each of the narrow fluid-flow portions 74 may be adjusted by forming, in the umbrella member 22, through-holes having appropriate dimensions.

In each of the first and second engine mounts 10, 80, the orifice passage 52 is employed to damp the low-frequency vibration and the rubber plate 56 is employed to damp the medium-frequency vibration. However, the orifice passage 52 and/or the rubber plate 56 may, or may not, be employed depending upon the vibration damping characteristics the engine mount 10, 80 is desired to have. Thus, each of the orifice passage 52 and the rubber plate 56 is not essential to the concept of the present invention.

The concept of the present invention is applicable to not only automotive-vehicle engine mounts but also automotive-vehicle body mounts, differential mounts, and suspension bushings, and additionally to various vibration damping devices which are employed in other structures than automotive vehicles.

It is to be understood that the present invention may be embodied with other changes, modifications, and improvements that may occur to one skilled in the art without departing from the scope and spirit of the invention defined in the appended claims.

What is claimed is:

1. A fluid-filled vibration damping device for connecting two members to each other in a vibration damping fashion, comprising:

a first mounting member which is adapted to be attached to one of the two members;

a second mounting member which is adapted to be attached to the other of the two members;

an elastic rubber body which elastically connects the first and second mounting members to each other and which provides a portion of a fluid-chamber wall defining a fluid chamber filled with a non-compressible fluid; and a working member which is supported by the first mounting member such that the working member extends, in the fluid chamber, in a first direction substantially perpendicular to a second direction in which a main vibrational load is applied to the fluid-filled vibration damping device, and thereby divides the fluid chamber into two divided chambers which are located, in the second direction, on opposite sides of the working member, respectively, and which are communicated with each other via a fluid-flow restricting passage defined by at least the working member, at least one of a length of the fluid-flow restricting passage in the second direction and a width of the restricting passage in the first direction changing in a circumferential direction of the working member, the restricting passage consisting of (a) a pair of first fluid-flow portions which are opposed to each other in the first direction, each of the two first fluid-flow portions extending over an angle of from 30 degrees to 80 degrees in the circumferential direction of the working member, and having a first ratio, $A_s/L_s$, of a cross-section area, $A_s$, thereof to the length, $L_s$, thereof; and (b) a pair of second fluid-flow portions which are opposed to each other in a direction perpendicular to each of the first and second directions, each of the two second fluid-flow portions extending over an angle of from 150 degrees to 100 degrees in the circumferential direction of the working member, and having a second ratio, $A_w/L_w$, of a cross-section area, $A_w$, thereof to the length, $L_w$, thereof, the second ratio $A_w/L_w$ being greater than the first ratio $A_s/L_s$, and a ratio, $(A_s/L_s)/(A_w/L_w)$, of the first ratio $A_s/L_s$ to the second ratio $A_w/L_w$ being not smaller than $1/10$ and being not greater than $1/2$.

2. A fluid-filled vibration damping device according to claim 1, wherein said each of the two first fluid-flow portions extends over an angle of from 40 degrees to 60 degrees in the circumferential direction of the working member, and said each of the two second fluid-flow portions extends over an angle of from 140 degrees to 120 degrees in the circumferential direction of the working member.

3. A fluid-filled vibration damping device according to claim 1, wherein the ratio $(A_s/L_s)/(A_w/L_w)$ is not smaller than $1/6$ and is not greater than $1/3$.

4. A fluid-filled vibration damping device according to claim 1, wherein at least one of the cross-section area $A_s$ and the length $L_s$ of said each first fluid-flow portion is different from a corresponding one of the cross-section area $A_w$ and the length $L_w$ of said each second fluid-flow portion.

5. A fluid-filled vibration damping device according to claim 1, wherein the second mounting member includes a tubular portion having an end open toward the first mounting member, the elastic rubber body elastically connecting between the first mounting member and the open end of the tubular portion of the second mounting member, said tubular portion of the second mounting member providing a tubular portion of the fluid-chamber wall.

6. A fluid-filled vibration damping device according to claim 1, wherein the width of the fluid-flow restricting passage changes in the circumferential direction of the working member, the two first fluid-flow portions of the restricting passage comprising two narrow fluid-flow portions, the two second fluid-flow portions comprising two wide fluid-flow portions the width of each of which is greater than the width of each of the two narrow fluid-flow portions.

7. A fluid-filled vibration damping device according to claim 6, wherein the length of the fluid-flow restricting passage does not change over an entirety thereof, so that the length of each of the two narrow fluid-flow portions and the two wide fluid-flow portions does not change over an entirety thereof and so that the the length $L_s$ of said each narrow fluid-flow portion is substantially equal to the length $L_w$ of said each wide fluid-flow portion.

8. A fluid-filled vibration damping device according to claim 1, wherein each of the two first fluid-flow portions of the fluid-flow restricting passage is defined by, and between, an outer circumferential surface of the working member and an inner circumferential surface of the fluid-chamber wall that are opposed to each other, and wherein the width of said each first fluid-flow portion in the first direction does not change over an entirety thereof in the circumferential direction of the working member.

9. A fluid-filled vibration damping device according to claim 1, wherein the working member has an outer circumferential surface having a first diameter, and the fluid-chamber wall has an inner circumferential surface which has a second diameter greater than the first diameter and which cooperates with the outer circumferential surface of the working member to define an annular gap which extends over an entirety thereof with a substantially constant width, in the circumferential direction of the working member, and wherein the working member has a pair of through-holes which are formed through a thickness thereof such that the two through-holes are opposed to each other in a radial direction of the working member, each of the two second fluid-flow portions comprising a corresponding one of the two through-holes and a portion of the annular gap that is located outside said one through-hole, each of the two first fluid-flow portions comprising a portion of the annular gap that is located outside a corresponding one of a pair of two hole-free portions of the working member that are free of the through-holes.

10. A fluid-filled vibration damping device according to claim 1, wherein the fluid-chamber wall has a cylindrical inner surface having a predetermined diameter, and the working member includes a pair of first radial portions each of which has an outer surface having a first radius of curvature, and a pair of second radial portions each of which has an outer surface having a second radius of curvature greater than the first radius of curvature, each of the two first fluid-flow portions being defined by, and between, the outer surface of a corresponding one of the two first radial portions and the cylindrical inner surface of the fluid-chamber wall, each of the two second fluid-flow portions being defined by the outer surface of a corresponding one of the two second radial portions and the cylindrical inner surface of the fluid-chamber wall.

11. A fluid-filled vibration damping device according to claim 1, wherein the second mounting member provides a rigid tubular portion of the fluid-chamber wall, such that the rigid tubular portion is spaced from an outer surface of the working member in the first direction, and wherein the fluid-filled vibration damping device further comprises a cushion rubber layer which is provided on at least one of the outer surface of the working member and an inner surface of the rigid tubular portion that are opposed to each other, a relative movement between the first and second mounting members in the first direction being limited by abutting contact of the working member with the rigid tubular portion via the cushion rubber layer.

12. A fluid-filled vibration damping device according to claim 1, further comprising, in addition to the fluid chamber as a primary fluid chamber, an auxiliary fluid chamber which produces, upon application of the main vibrational load to the vibration damping device, a pressure difference with respect to the primary fluid chamber; and an orifice passage which communicates the primary and auxiliary fluid chambers with each other.

* * * * *